(12) United States Patent
Watson

(10) Patent No.: US 11,705,859 B2
(45) Date of Patent: Jul. 18, 2023

(54) RADIAL CAM HELIX WITH 0 DEGREE STOW FOR SOLAR TRACKER

(71) Applicant: NEXTracker LLC, Fremont, CA (US)

(72) Inventor: Tyler Watson, San Francisco, CA (US)

(73) Assignee: NEXTracker LLC, Fremont, CA (US)

(*) Notice: Subject to any disclaimer, the term of this patent is extended or adjusted under 35 U.S.C. 154(b) by 0 days.

(21) Appl. No.: 17/357,782

(22) Filed: Jun. 24, 2021

(65) Prior Publication Data
US 2021/0391823 A1 Dec. 16, 2021

Related U.S. Application Data

(63) Continuation of application No. 16/418,433, filed on May 21, 2019, now Pat. No. 11,050,383.

(51) Int. Cl.
| | |
|---|---|
| *H02S 20/32* | (2014.01) |
| *F24S 40/80* | (2018.01) |
| *F24S 25/65* | (2018.01) |
| *F24S 30/00* | (2018.01) |
| *F24S 25/12* | (2018.01) |

(52) U.S. Cl.
CPC .............. *H02S 20/32* (2014.12); *F24S 40/85* (2018.05); *F24S 25/12* (2018.05); *F24S 25/65* (2018.05); *F24S 2030/11* (2018.05); *F24S 2030/135* (2018.05); *F24S 2030/14* (2018.05); *Y02E 10/50* (2013.01)

(58) Field of Classification Search
CPC . H02S 20/32; F24S 40/85; F24S 25/12; F24S 25/65; F24S 2030/11; F24S 2030/135; F24S 2030/14; F24S 2030/425; Y02E 10/50; Y02E 10/47
See application file for complete search history.

(56) References Cited

U.S. PATENT DOCUMENTS

| | | |
|---|---|---|
| 2,359,156 A | 9/1944 | Richey et al. |
| 4,063,543 A | 12/1977 | Hedger |
| 4,172,443 A | 10/1979 | Sommer |

(Continued)

FOREIGN PATENT DOCUMENTS

| | | |
|---|---|---|
| CN | 203423651 U | 2/2014 |
| CN | 104966748 A | 10/2015 |

(Continued)

OTHER PUBLICATIONS

"Axus Solar Tracker Data Sheet" available at http://www.axsussolar.com/#intro [retrieved on Sep. 12, 2018].

(Continued)

*Primary Examiner* — Devina Pillay
(74) *Attorney, Agent, or Firm* — Fredrikson & Byron, P.A.

(57) ABSTRACT

A solar tracking system including a plurality of bases, a torque tube supported by the plurality of bases and configured to support a plurality of solar modules, and a drive device operably connected to the torque tube and arranged to translate the torque tube in a direction parallel to its longitudinal axis. The solar tracking system also includes a plurality of helical guides operably connected to the torque tube, and a plurality of cam assemblies, wherein upon linear movement of the torque tube, interaction between the helical guides and cam assemblies causes the torque tube to rotate about its linear axis.

19 Claims, 6 Drawing Sheets

(56) References Cited

U.S. PATENT DOCUMENTS

| | | | |
|---|---|---|---|
| 4,875,726 A | 10/1989 | Thau |
| 4,936,611 A | 6/1990 | Palvolgyi |
| 4,968,355 A | 11/1990 | Johnson |
| 4,984,389 A | 1/1991 | Benoit et al. |
| 5,000,495 A | 3/1991 | Wolfgang et al. |
| 5,067,605 A | 11/1991 | Gordon |
| 5,106,134 A | 4/1992 | Thau |
| 5,197,589 A | 3/1993 | Gordon |
| 5,317,145 A | 5/1994 | Corio |
| 5,512,742 A | 4/1996 | Mattson |
| 5,622,078 A | 4/1997 | Mattson |
| 5,947,547 A | 9/1999 | Deeks et al. |
| 6,029,977 A | 2/2000 | Sym |
| 6,058,930 A | 5/2000 | Shingleton |
| 6,105,316 A | 8/2000 | Bottger et al. |
| 6,260,893 B1 | 7/2001 | Wilson |
| 6,315,295 B1 | 11/2001 | Sym |
| 6,365,277 B1 | 4/2002 | Wilson |
| 6,454,974 B1 | 9/2002 | Wilson |
| 6,558,605 B1 | 5/2003 | Wilson |
| 6,563,040 B2 | 5/2003 | Hayden et al. |
| 6,586,088 B1 | 7/2003 | Wilson |
| 6,662,801 B2 | 12/2003 | Hayden et al. |
| 6,682,811 B1 | 7/2004 | Wilson |
| D496,248 S | 9/2004 | Liebendorfer |
| D496,249 S | 9/2004 | Liebendorfer |
| 6,872,432 B2 | 3/2005 | Wilson |
| 6,923,482 B2 | 8/2005 | Cumming et al. |
| 6,927,695 B2 | 8/2005 | Hayden |
| 6,932,204 B2 | 8/2005 | Dolan |
| 6,977,115 B1 | 12/2005 | Wilson |
| 6,988,305 B1 | 1/2006 | Wilson |
| 7,059,657 B2 | 6/2006 | Bodin et al. |
| 7,169,467 B2 | 1/2007 | Wilson |
| 7,170,025 B2 | 1/2007 | Martin Gonzalez |
| 7,172,238 B2 | 2/2007 | Bodin et al. |
| 7,252,083 B2 | 8/2007 | Hayden |
| 7,260,918 B2 | 8/2007 | Liebendorfer |
| D560,605 S | 1/2008 | McClintock et al. |
| D560,606 S | 1/2008 | McClintock et al. |
| 7,316,432 B2 | 1/2008 | Muskos |
| 7,316,446 B2 | 1/2008 | Wikstrom |
| 7,344,008 B1 | 3/2008 | Jonsson et al. |
| D565,505 S | 4/2008 | Shugar et al. |
| 7,357,132 B2 | 4/2008 | Hayden |
| 7,357,430 B2 | 4/2008 | Karlander |
| 7,413,226 B2 | 8/2008 | Muskos |
| D576,478 S | 9/2008 | Mead et al. |
| 7,434,362 B2 | 10/2008 | Liebendorfer |
| D586,737 S | 2/2009 | Shugar et al. |
| 7,531,741 B1 | 5/2009 | Melton et al. |
| 7,557,292 B2 | 7/2009 | Shingleton et al. |
| D600,638 S | 9/2009 | Plaisted et al. |
| D601,491 S | 10/2009 | Burtt |
| 7,600,349 B2 | 10/2009 | Liebendorfer |
| 7,611,175 B2 | 11/2009 | Tornberg |
| 7,631,924 B2 | 12/2009 | Nilsson |
| 7,647,924 B2 | 1/2010 | Hayden |
| D611,895 S | 3/2010 | Plaisted et al. |
| 7,678,208 B2 | 3/2010 | Bodin |
| D613,243 S | 4/2010 | Burtt |
| 7,721,492 B2 | 5/2010 | Plaisted et al. |
| 7,748,175 B2 | 7/2010 | Liebendorfer |
| 7,766,292 B2 | 8/2010 | Liebendorfer |
| 7,793,996 B2 | 9/2010 | Karlander |
| 7,793,997 B2 | 9/2010 | Karlander |
| 7,794,006 B2 | 9/2010 | Karlander |
| 7,836,879 B2 | 11/2010 | Mackamul et al. |
| 7,856,769 B2 | 12/2010 | Plaisted et al. |
| 7,857,269 B2 | 12/2010 | Plaisted et al. |
| D630,576 S | 1/2011 | Plaisted et al. |
| 7,871,122 B2 | 1/2011 | Salomonsson |
| 7,874,601 B2 | 1/2011 | Tanskanen |
| 7,888,587 B2 | 2/2011 | Shingleton et al. |
| 7,900,407 B2 | 3/2011 | Plaisted |
| 7,905,526 B2 | 3/2011 | Asplund |
| 7,938,462 B2 | 5/2011 | Nilsson |
| 7,954,863 B2 | 6/2011 | Ahlin |
| 7,958,886 B2 | 6/2011 | Barsun et al. |
| 7,976,257 B2 | 7/2011 | Kufner |
| 8,023,266 B2 | 9/2011 | Russell et al. |
| D647,843 S | 11/2011 | Albritton et al. |
| D648,425 S | 11/2011 | Plaisted et al. |
| 8,052,100 B2 | 11/2011 | Zante et al. |
| 8,061,762 B2 | 11/2011 | Arvidsson et al. |
| 8,087,706 B2 | 1/2012 | Karlander et al. |
| 8,096,595 B2 | 1/2012 | Muskos |
| 8,096,596 B2 | 1/2012 | Steiner |
| 8,101,849 B2 | 1/2012 | Almy et al. |
| 8,123,265 B2 | 2/2012 | Nilsson |
| D655,210 S | 3/2012 | Narayanamurthy et al. |
| 8,128,044 B2 | 3/2012 | Liebendorfer |
| 8,156,697 B2 | 4/2012 | Miros et al. |
| 8,158,877 B2 | 4/2012 | Klein et al. |
| 8,177,180 B2 | 5/2012 | Plaisted et al. |
| 8,188,413 B2 | 5/2012 | Kats et al. |
| 8,188,415 B2 | 5/2012 | Kats et al. |
| 8,191,320 B2 | 6/2012 | Mittan et al. |
| 8,191,943 B2 | 6/2012 | Hellstrom |
| 8,203,110 B2 | 6/2012 | Silvestre Mata |
| 8,220,580 B2 | 7/2012 | Isaksson et al. |
| 8,230,850 B2 | 7/2012 | Barsun et al. |
| 8,234,821 B2 | 8/2012 | Plaisted et al. |
| 8,240,109 B2 | 8/2012 | Cusson et al. |
| 8,246,090 B2 | 8/2012 | Loveborn |
| 8,256,169 B2 | 9/2012 | Cusson et al. |
| 8,256,170 B2 | 9/2012 | Plaisted et al. |
| 8,266,848 B2 | 9/2012 | Miros et al. |
| 8,274,028 B2 | 9/2012 | Needham |
| 8,291,653 B2 | 10/2012 | Suarez et al. |
| 8,292,354 B2 | 10/2012 | Bodin et al. |
| 8,300,439 B2 | 10/2012 | Little et al. |
| 8,304,644 B2 | 11/2012 | Wares et al. |
| 8,316,590 B2 | 11/2012 | Cusson |
| 8,344,239 B2 | 1/2013 | Plaisted |
| 8,349,144 B2 | 1/2013 | Black et al. |
| 8,382,199 B2 | 2/2013 | Bodin |
| 8,383,943 B2 | 2/2013 | Little et al. |
| D677,619 S | 3/2013 | Truthseeker et al. |
| 8,397,448 B2 | 3/2013 | Brown et al. |
| 8,407,950 B2 | 4/2013 | Hartelius |
| 8,413,391 B2 | 4/2013 | Seery et al. |
| 8,434,230 B2 | 5/2013 | Bodin et al. |
| 8,453,328 B2 | 6/2013 | Kats et al. |
| 8,459,249 B2 | 6/2013 | Corio |
| 8,464,496 B2 | 6/2013 | Cusson et al. |
| 8,465,088 B2 | 6/2013 | Bodin et al. |
| D687,839 S | 8/2013 | Narayanamurthy |
| D688,620 S | 8/2013 | Burtt |
| 8,546,681 B2 | 10/2013 | Wares et al. |
| 8,567,134 B1 | 10/2013 | Grushkowitz et al. |
| 8,578,928 B2 | 11/2013 | Clavijo Lumbreras |
| 8,578,929 B2 | 11/2013 | Krabbe et al. |
| 8,604,404 B1 | 12/2013 | Linderman |
| 8,615,939 B2 | 12/2013 | Seery et al. |
| D697,022 S | 1/2014 | Truthseeker et al. |
| 8,640,400 B2 | 2/2014 | Liebendorfer |
| 8,641,539 B2 | 2/2014 | Paponneau |
| 8,650,812 B2 | 2/2014 | Cusson |
| 8,656,659 B2 | 2/2014 | Plaisted |
| 8,659,880 B2 | 2/2014 | Russell et al. |
| 8,660,708 B2 | 2/2014 | Narayanamurthy et al. |
| 8,665,610 B2 | 3/2014 | Kem |
| 8,671,930 B2 | 3/2014 | Liao |
| 8,684,449 B2 | 4/2014 | Bodin et al. |
| 8,704,080 B2 | 4/2014 | Conchy et al. |
| 8,712,745 B2 | 4/2014 | Wayne et al. |
| 8,720,431 B2 | 5/2014 | Kufner |
| 8,739,478 B1 | 6/2014 | Burtt et al. |
| 8,745,936 B2 | 6/2014 | Plaisted et al. |
| 8,754,627 B1 | 6/2014 | Le |
| 8,757,567 B2 | 6/2014 | Ciasulli et al. |
| 8,763,968 B2 | 7/2014 | Liebendorfer |
| 8,771,421 B2 | 7/2014 | Rathweg |

(56) References Cited

U.S. PATENT DOCUMENTS

| | | |
|---|---|---|
| 8,776,781 B2 | 7/2014 | Meydbray |
| 8,789,872 B2 | 7/2014 | Johansson |
| 8,790,451 B1 | 7/2014 | Narayanamurthy |
| 8,806,813 B2 | 8/2014 | Plaisted et al. |
| 8,807,129 B2 | 8/2014 | Mackamul |
| 8,807,839 B2 | 8/2014 | Jang |
| 8,816,870 B2 | 8/2014 | Plaisted et al. |
| 8,839,573 B2 | 9/2014 | Cusson et al. |
| 8,857,173 B2 | 10/2014 | Beale |
| 8,878,112 B2 | 11/2014 | Lee |
| 8,887,920 B2 | 11/2014 | Pelman et al. |
| 8,904,734 B2 | 12/2014 | Lucas et al. |
| 8,922,185 B2 | 12/2014 | Ehlmann et al. |
| 8,936,264 B2 | 1/2015 | Koormann et al. |
| 8,939,648 B2 | 1/2015 | Schneider et al. |
| 8,946,541 B2 | 2/2015 | Wares et al. |
| 8,946,542 B1 | 2/2015 | Truthseeker et al. |
| 8,946,608 B2 | 2/2015 | Sherman |
| 8,953,350 B2 | 2/2015 | Kern |
| 8,968,496 B2 | 3/2015 | Larsson et al. |
| 8,988,182 B2 | 3/2015 | Kern |
| 8,993,870 B2 | 3/2015 | Eom |
| 9,027,289 B1 | 5/2015 | Burtt |
| 9,035,168 B2 | 5/2015 | Barton |
| 9,038,329 B2 | 5/2015 | Pelman et al. |
| 9,057,542 B2 | 6/2015 | Schuit et al. |
| 9,090,138 B2 | 7/2015 | Haselhorst et al. |
| 9,103,563 B1 | 8/2015 | Burtt |
| 9,127,330 B2 | 9/2015 | Krispinsson |
| 9,140,403 B2 | 9/2015 | Blitz et al. |
| 9,145,906 B2 | 9/2015 | Schuit et al. |
| 9,160,273 B2 | 10/2015 | Schuit et al. |
| 9,166,525 B2 | 10/2015 | Grant |
| 9,168,801 B2 | 10/2015 | Dicke et al. |
| 9,170,031 B2 | 10/2015 | West et al. |
| 9,184,324 B2 | 11/2015 | Wares et al. |
| 9,188,366 B2 | 11/2015 | Thurner et al. |
| 9,205,726 B2 | 12/2015 | Arvidsson |
| 9,234,364 B2 | 1/2016 | Abad Huber et al. |
| 9,243,818 B2 | 1/2016 | Shugar et al. |
| 9,249,925 B2 | 2/2016 | Roensch et al. |
| 9,252,307 B2 | 2/2016 | Hartelius |
| 9,252,314 B2 | 2/2016 | Wares et al. |
| 9,254,800 B2 | 2/2016 | Nilsson |
| 9,279,415 B1 | 3/2016 | Huber et al. |
| 9,279,457 B2 | 3/2016 | Grushkowitz |
| 9,279,521 B2 | 3/2016 | Miyatake et al. |
| 9,281,419 B2 | 3/2016 | Klein et al. |
| 9,281,431 B2 | 3/2016 | Linderman |
| 9,281,778 B2 | 3/2016 | Corio et al. |
| 9,303,663 B2 | 4/2016 | Greenamyer et al. |
| 9,303,684 B2 | 4/2016 | Lumbreras |
| 9,322,436 B2 | 4/2016 | Tokunaga et al. |
| 9,322,437 B2 | 4/2016 | Agullo |
| 9,342,087 B2 | 5/2016 | Chen et al. |
| 9,343,592 B2 | 5/2016 | Hunt |
| 9,352,941 B2 | 5/2016 | Wheeler et al. |
| 9,391,380 B2 | 7/2016 | Little et al. |
| 9,395,103 B2 | 7/2016 | Conley et al. |
| 9,397,606 B2 | 7/2016 | Liebendorfer |
| 9,413,287 B2 | 8/2016 | Hartelius |
| 9,452,724 B2 | 9/2016 | Nilsson |
| 9,453,660 B2 | 9/2016 | French et al. |
| 9,453,899 B2 | 9/2016 | Paponneau |
| 9,455,661 B2 | 9/2016 | Meydbray |
| 9,455,663 B1 | 9/2016 | Carrington |
| 9,462,734 B2 | 10/2016 | Swahn et al. |
| 9,477,247 B2 | 10/2016 | Ehlmann et al. |
| 9,482,449 B2 | 11/2016 | Cole et al. |
| 9,505,443 B2 | 11/2016 | Bodin |
| 9,581,678 B2 | 2/2017 | Corio |
| 9,584,062 B2 | 2/2017 | Ganshaw et al. |
| 9,593,867 B2 | 3/2017 | Seery et al. |
| 9,601,645 B2 | 3/2017 | Seery et al. |
| 9,610,910 B2 | 4/2017 | Muskos |
| 9,615,470 B2 | 4/2017 | Sherwood et al. |
| 9,631,840 B2 | 4/2017 | Corio |
| 9,641,123 B2 | 5/2017 | Swahn et al. |
| 9,654,052 B2 | 5/2017 | Paponneau |
| 9,655,292 B2 | 5/2017 | Swahn et al. |
| 9,657,967 B2 | 5/2017 | Adriani et al. |
| 9,687,898 B2 | 6/2017 | Loesch |
| D792,342 S | 7/2017 | Purigraski et al. |
| 9,743,501 B2 | 8/2017 | Ciasulli et al. |
| 9,744,997 B2 | 8/2017 | Olofsson et al. |
| 9,746,655 B2 | 8/2017 | Wares et al. |
| D799,420 S | 10/2017 | Purigraski et al. |
| D800,537 S | 10/2017 | Harris |
| D800,544 S | 10/2017 | Schuit et al. |
| 9,803,893 B2 | 10/2017 | Giraudo et al. |
| 9,806,669 B2 | 10/2017 | Welle |
| D801,781 S | 11/2017 | Schuit et al. |
| D801,913 S | 11/2017 | Bauer et al. |
| D801,914 S | 11/2017 | Bauer et al. |
| D801,915 S | 11/2017 | Bauer et al. |
| D803,040 S | 11/2017 | Schuit et al. |
| 9,819,301 B2 | 11/2017 | Ripoll Agullo |
| 9,831,365 B2 | 11/2017 | Pelman et al. |
| 9,837,955 B1 | 12/2017 | Schuit et al. |
| D808,066 S | 1/2018 | Young |
| 9,927,150 B2 | 3/2018 | Eckl et al. |
| D815,303 S | 4/2018 | Schuit et al. |
| D815,308 S | 4/2018 | Schuit et al. |
| 9,937,846 B2 | 4/2018 | French et al. |
| 11,050,383 B2 * | 6/2021 | Watson .............. F24S 30/425 |
| 11,387,771 B2 * | 7/2022 | Au .................. F24S 30/425 |
| 2004/0261334 A1 | 12/2004 | Liebendorfer et al. |
| 2005/0126621 A1 | 6/2005 | Dinwoodie et al. |
| 2007/0107767 A1 | 5/2007 | Hayden et al. |
| 2008/0185034 A1 | 8/2008 | Corio |
| 2008/0236570 A1 | 10/2008 | Kufner |
| 2008/0292424 A1 | 11/2008 | Kufner |
| 2009/0025708 A1 | 1/2009 | Shingleton |
| 2009/0134291 A1 | 5/2009 | Meier et al. |
| 2009/0232616 A1 | 9/2009 | Sekreta et al. |
| 2009/0260316 A1 | 10/2009 | Jones et al. |
| 2009/0320826 A1 | 12/2009 | Kufner |
| 2010/0059045 A1 | 3/2010 | Diaz et al. |
| 2010/0089390 A1 | 4/2010 | Miros et al. |
| 2010/0101559 A1 | 4/2010 | Grant et al. |
| 2010/0102201 A1 | 4/2010 | Sherman |
| 2010/0139741 A1 | 6/2010 | Wares |
| 2010/0179678 A1 | 7/2010 | Dinwoodie et al. |
| 2010/0193012 A1 | 8/2010 | Klammer et al. |
| 2010/0217724 A1 | 8/2010 | Wayne et al. |
| 2011/0044083 A1 | 2/2011 | Thompson |
| 2011/0138599 A1 | 6/2011 | Bellacicco et al. |
| 2011/0174295 A1 | 7/2011 | Lumbreras |
| 2011/0220596 A1 | 9/2011 | Cusson et al. |
| 2011/0240007 A1 | 10/2011 | Currier |
| 2011/0272367 A1 | 11/2011 | Kufner |
| 2011/0272368 A1 | 11/2011 | Kufner |
| 2012/0027550 A1 | 2/2012 | Bellacicco et al. |
| 2012/0031030 A1 | 2/2012 | Cusson et al. |
| 2012/0031039 A1 | 2/2012 | Cusson et al. |
| 2012/0073565 A1 | 3/2012 | Grant et al. |
| 2012/0097149 A1 * | 4/2012 | Doyle .................. F24S 25/70 126/714 |
| 2012/0124922 A1 | 5/2012 | Cusson et al. |
| 2012/0125399 A1 | 5/2012 | Schatz et al. |
| 2012/0187058 A1 | 7/2012 | Almy et al. |
| 2012/0216852 A1 | 8/2012 | Almy et al. |
| 2012/0266938 A1 | 10/2012 | Goei et al. |
| 2012/0266940 A1 | 10/2012 | Grant et al. |
| 2013/0037081 A1 | 2/2013 | Grant |
| 2013/0037082 A1 | 2/2013 | Grant |
| 2013/0088329 A1 | 4/2013 | Chrysostom et al. |
| 2013/0098858 A1 | 4/2013 | Cusson et al. |
| 2013/0112239 A1 | 5/2013 | Liptac et al. |
| 2013/0269752 A1 | 10/2013 | Corio |
| 2013/0269753 A1 | 10/2013 | Corio |
| 2014/0000705 A1 | 1/2014 | Sounni et al. |
| 2014/0020734 A1 | 1/2014 | Baker et al. |
| 2014/0090638 A1 | 4/2014 | Grushkowitz |

(56) References Cited

U.S. PATENT DOCUMENTS

| | | |
|---|---|---|
| 2014/0140755 A1 | 5/2014 | Lumbreras |
| 2014/0151312 A1 | 6/2014 | Cusson et al. |
| 2014/0174533 A1 | 6/2014 | Buller et al. |
| 2014/0263899 A1 | 9/2014 | Harris et al. |
| 2014/0270979 A1 | 9/2014 | Cusson et al. |
| 2014/0290716 A1 | 10/2014 | Stubbs |
| 2014/0318605 A1 | 10/2014 | Huzyak et al. |
| 2014/0338659 A1 | 11/2014 | Corio |
| 2014/0338722 A1 | 11/2014 | Feldman-Peabody et al. |
| 2014/0375132 A1 | 12/2014 | Agarwal et al. |
| 2015/0000725 A1 | 1/2015 | Reilly et al. |
| 2015/0040944 A1 | 2/2015 | Dinwoodie et al. |
| 2015/0082923 A1 | 3/2015 | Morgan et al. |
| 2015/0082924 A1 | 3/2015 | Morgan |
| 2015/0090378 A1 | 4/2015 | Eriksson et al. |
| 2015/0101655 A1 | 4/2015 | Schuit et al. |
| 2015/0117067 A1 | 4/2015 | Naiknaware et al. |
| 2015/0121784 A1 | 5/2015 | Huber et al. |
| 2015/0136205 A1 | 5/2015 | Worden |
| 2015/0144156 A1 | 5/2015 | French et al. |
| 2015/0165544 A1 | 6/2015 | Mesa et al. |
| 2015/0171786 A1 | 6/2015 | Worden |
| 2015/0200619 A1 | 7/2015 | Worden |
| 2015/0203963 A1 | 7/2015 | Powell |
| 2015/0207452 A1 | 7/2015 | Werner et al. |
| 2015/0239061 A1 | 8/2015 | Hamlock et al. |
| 2015/0316639 A1 | 11/2015 | Russ et al. |
| 2015/0349706 A1 | 12/2015 | Grossman et al. |
| 2015/0355017 A1 | 12/2015 | Clarke et al. |
| 2015/0372636 A1 | 12/2015 | Menard |
| 2015/0377518 A1 | 12/2015 | Maxey et al. |
| 2015/0377520 A1 | 12/2015 | Kufner |
| 2016/0013751 A1 | 1/2016 | Welle et al. |
| 2016/0028345 A1 | 1/2016 | Wares et al. |
| 2016/0044843 A1 | 2/2016 | Swahn et al. |
| 2016/0065121 A1 | 3/2016 | Bugg et al. |
| 2016/0065123 A1 | 3/2016 | Hayes et al. |
| 2016/0079907 A1 | 3/2016 | Russell et al. |
| 2016/0096135 A1 | 4/2016 | Woolard |
| 2016/0099572 A1 | 4/2016 | Gupta et al. |
| 2016/0102891 A1 | 4/2016 | Paponneau |
| 2016/0104084 A1 | 4/2016 | Philip et al. |
| 2016/0118933 A1 | 4/2016 | Russell et al. |
| 2016/3011665 | 4/2016 | Wheeler |
| 2016/0124067 A1 | 5/2016 | Paponneau |
| 2016/0140282 A1 | 5/2016 | Morse et al. |
| 2016/0140283 A1 | 5/2016 | Morse et al. |
| 2016/0190976 A1 | 6/2016 | Corio et al. |
| 2016/0195303 A1 | 7/2016 | Lambert et al. |
| 2016/0204733 A1 | 7/2016 | Agullo |
| 2016/0218662 A1 | 7/2016 | Deger et al. |
| 2016/0218663 A1 | 7/2016 | Werner et al. |
| 2016/0254673 A1 | 9/2016 | Batten et al. |
| 2016/0260848 A1 | 9/2016 | Schuh |
| 2016/0261225 A1 | 9/2016 | Paponneau |
| 2016/0261232 A1 | 9/2016 | Grushkowitz et al. |
| 2016/0285415 A1 | 9/2016 | Hunt |
| 2016/0301356 A1 | 10/2016 | Liebendorfer |
| 2016/0308488 A1 | 10/2016 | Liu et al. |
| 2016/0311665 A1 | 10/2016 | Wheeler et al. |
| 2016/0322827 A1 | 11/2016 | Gupta et al. |
| 2016/0322829 A1 | 11/2016 | Klein et al. |
| 2016/0329860 A1 | 11/2016 | Kalus et al. |
| 2016/0336900 A1 | 11/2016 | Paponneau et al. |
| 2016/0365823 A1 | 12/2016 | French et al. |
| 2016/0365830 A1 | 12/2016 | Bailey et al. |
| 2016/0370033 A1 | 12/2016 | Mateille et al. |
| 2017/0005614 A1 | 1/2017 | Cole et al. |
| 2017/0012437 A1 | 1/2017 | Ehlmann et al. |
| 2017/0019060 A1 | 1/2017 | Dinwoodie et al. |
| 2017/0025989 A1 | 1/2017 | Shaw |
| 2017/0040928 A1 | 2/2017 | Schuit et al. |
| 2017/0040931 A1 | 2/2017 | Schuit et al. |
| 2017/0047885 A1 | 2/2017 | Swahn et al. |
| 2017/0050272 A1 | 2/2017 | Holmberg et al. |
| 2017/0054407 A1 | 2/2017 | Swahn et al. |
| 2017/0063288 A1 | 3/2017 | Schuit et al. |
| 2017/0066394 A1 | 3/2017 | Nilsson |
| 2017/0066481 A1 | 3/2017 | Bodin |
| 2017/0073911 A1 | 3/2017 | Holland et al. |
| 2017/0080523 A1 | 3/2017 | Andersson et al. |
| 2017/0102168 A1 | 4/2017 | Childress |
| 2017/0111006 A1 | 4/2017 | Vietas et al. |
| 2017/0126168 A1 | 5/2017 | Worden |
| 2017/0126169 A1 | 5/2017 | Worden |
| 2017/0133975 A1 | 5/2017 | Ganshaw et al. |
| 2017/0146264 A1 | 5/2017 | Ingram |
| 2017/0149373 A1 | 5/2017 | Aghatehrani et al. |
| 2017/0149375 A1 | 5/2017 | Bailey et al. |
| 2017/0155356 A1 | 6/2017 | Schuit et al. |
| 2017/0159318 A1 | 6/2017 | Cusson et al. |
| 2017/0160372 A1 | 6/2017 | Corio |
| 2017/0163209 A1 | 6/2017 | Bailey et al. |
| 2017/0170777 A1 | 6/2017 | Dinwoodie et al. |
| 2017/0187192 A1 | 6/2017 | Jeanty et al. |
| 2017/0234580 A1 | 8/2017 | Worden |
| 2017/0237388 A1 | 8/2017 | Praca et al. |
| 2017/0252791 A1 | 9/2017 | Loesch |
| 2017/0257057 A1 | 9/2017 | Swahn et al. |
| 2017/0269919 A1 | 9/2017 | Cherukupalli et al. |
| 2017/0272029 A1 | 9/2017 | Liebendorfer |
| 2017/0279405 A1 | 9/2017 | Wares |
| 2017/0314819 A1 | 11/2017 | Adriani et al. |
| 2017/0331414 A1 | 11/2017 | Bailey et al. |
| 2017/0338768 A1 | 11/2017 | Prakash et al. |
| 2017/0353146 A1 | 12/2017 | Praca et al. |
| 2017/0359017 A1 | 12/2017 | Corio |
| 2017/0373632 A1 | 12/2017 | Bauer et al. |
| 2018/0013380 A1 | 1/2018 | Childress et al. |
| 2018/0029549 A1 | 2/2018 | Palo |
| 2018/0054066 A1 | 2/2018 | Ehlmann et al. |
| 2018/0062563 A1 | 3/2018 | Bapat et al. |
| 2018/0062564 A1 | 3/2018 | Grushkowitz et al. |
| 2018/0062565 A1 | 3/2018 | Schimelpfenig et al. |
| 2018/0062566 A1 | 3/2018 | Grushkowitz et al. |
| 2018/0062567 A1 | 3/2018 | Oh et al. |
| 2018/0062569 A1 | 3/2018 | Oh et al. |
| 2018/0073773 A1 | 3/2018 | Grushkowitz et al. |
| 2018/0087908 A1 | 3/2018 | Bailey et al. |
| 2018/0091087 A1 | 3/2018 | Bailey et al. |
| 2018/0091088 A1 | 3/2018 | Barton et al. |
| 2019/0052224 A1 | 2/2019 | Schatz et al. |
| 2019/0379323 A1* | 12/2019 | Au ................ F16H 19/025 |

FOREIGN PATENT DOCUMENTS

| | | |
|---|---|---|
| CN | 104993002 A | 10/2015 |
| CN | 204810206 U | 11/2015 |
| CN | 204885197 U | 12/2015 |
| CN | 105242693 A | 1/2016 |
| CN | 204948015 U | 1/2016 |
| CN | 106410957 A | 2/2017 |
| CN | 106602989 A | 4/2017 |
| CN | 206117576 U | 4/2017 |
| CN | 206117579 U | 4/2017 |
| CN | 106656009 A | 5/2017 |
| CN | 106788182 A | 5/2017 |
| CN | 206293452 U | 6/2017 |
| CN | 206294126 U | 6/2017 |
| CN | 206299691 U | 7/2017 |
| CN | 206299703 U | 7/2017 |
| CN | 206301216 U | 7/2017 |
| CN | 206302372 U | 7/2017 |
| CN | 107063448 A | 8/2017 |
| CN | 206370808 U | 8/2017 |
| CN | 206412976 U | 8/2017 |
| CN | 206472091 U | 9/2017 |
| CN | 206506474 U | 9/2017 |
| CN | 206506480 U | 9/2017 |
| CN | 107294482 A | 10/2017 |
| CN | 206575370 U | 10/2017 |
| CN | 107387579 A | 11/2017 |
| CN | 107425805 A | 12/2017 |
| CN | 107656549 A | 2/2018 |

(56) References Cited

FOREIGN PATENT DOCUMENTS

| CN | 106788180 B | 7/2018 |
|---|---|---|
| DE | 102016219989 A1 | 4/2018 |
| WO | 2015025065 A1 | 2/2015 |
| WO | 2016191779 A1 | 12/2016 |
| WO | 2017044566 A1 | 3/2017 |
| WO | 2017091471 A1 | 6/2017 |
| WO | 2017200917 A1 | 11/2017 |
| WO | 2017210265 A1 | 12/2017 |
| WO | 2018009642 A1 | 1/2018 |
| WO | 2018009650 A1 | 1/2018 |
| WO | 2018071332 A1 | 4/2018 |
| WO | 2018009634 A1 | 2/2019 |

OTHER PUBLICATIONS

PCT Search Report and Written Opinion issued in corresponding PCT application No. PCT/US2019/035393 dated Aug. 9, 2019, 12 pages.
PCT Search Report and Written Opinion issued in PCT/US19/23617 dated Jun. 18, 2019, 6 pages.

\* cited by examiner

RADIAL CAM HELIX WITH 0 DEGREE STOW FOR SOLAR TRACKER

CROSS-REFERENCE TO RELATED APPLICATIONS

This application is a continuation of U.S. application Ser. No. 16/418,433 filed May 21, 2019, the entire contents of which are hereby incorporated by reference.

BACKGROUND

Technical Field

The present disclosure relates to solar systems, and more particularly, to solar tracker actuating systems for adjusting the orientation of the solar system to track the location of the sun.

Description of Related Art

Solar cells and solar panels are most efficient in sunny conditions when oriented towards the sun at a certain angle. Many solar panel systems are designs in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length.

Adjusting massive solar trackers requires power to drive the solar array as it follows the sun. As will be appreciated, the greater the load, the greater the amount of power necessary to drive the solar tracker. An additional design constraint of such systems is the rigidity required to accommodate the weight of the solar arrays and at times significant wind loading.

Further, the torsional excitation caused by wind loading exerts significant force upon the structure for supporting and the mechanisms for articulating the solar tracker. As such, increases in the size and number of components to reduce torsional excitation are required at varying locations along the length of the solar tracker. The present disclosure seeks to address the shortcomings of prior tracker systems.

SUMMARY

The present disclosure is directed to a solar tracking system including a plurality of bases, a torque tube supported by the plurality of bases and configured to support a plurality of solar modules, and a drive device operably connected to the torque tube and arranged to translate the torque tube in a direction parallel to its longitudinal axis. The solar tracking system also includes a plurality of helical guides operably connected to the torque tube, and a plurality of cam assemblies, wherein upon linear movement of the torque tube, interaction between the helical guides and cam assemblies causes the torque tube to rotate about its linear axis.

The drive device may include at least on power screw. And the helical guide may include a cam follower which mates with and follows one or more cams in the cam assembly. The cam follower may include a stow position portion. The stow position portion may corresponds to a 0-degree stow position wherein solar modules supported by the torque tube are substantially parallel to the ground.

The cam assembly may include a pair of cams, and the cam follower acts on the two cams to cause the rotation.

In the solar tracking system of the present disclosure, when driven to the 0-degree stow position, substantially all forces applied to the torque tube are translated though the cam follower, to the cams and to the plurality of bases.

The helical guide may include a body, a cam follower, and a plurality of flanges. The helical guide may be mechanically fastened to the torque tube and can include a plurality of webs.

The cam follower may be welded on a backside of the cam follower to strengthen the cam follower. Further, the helical guide may be formed of two parts, where each part has flanges and holes configured for mechanical connection to at least two orthogonal surfaces of the torque tube.

BRIEF DESCRIPTION OF THE DRAWINGS

Various aspects and features of the present disclosure are described hereinbelow with reference to the drawings, wherein.

DETAILED DESCRIPTION

Figure 1:
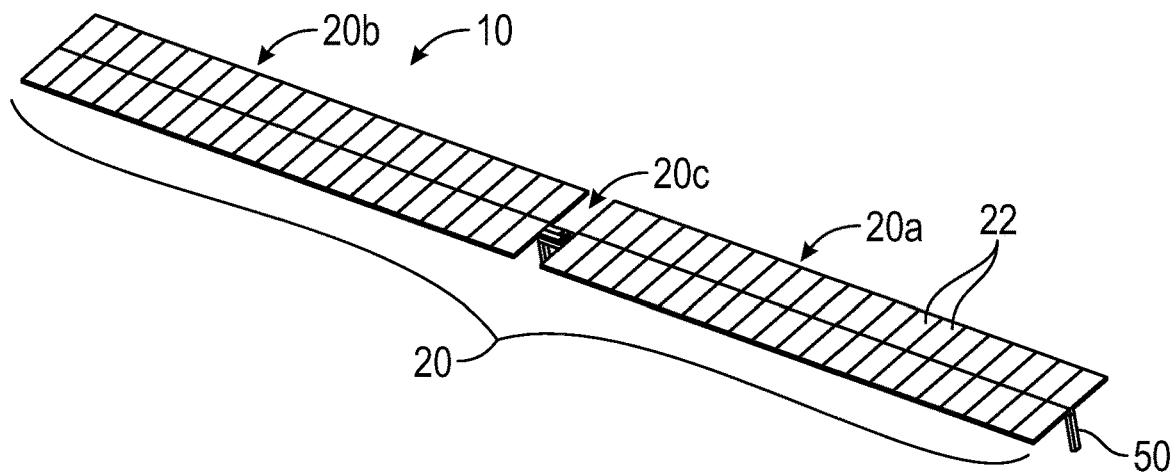
FIG. 1 is a perspective view of a solar tracking system in accordance with the present disclosure.
Figure 2:
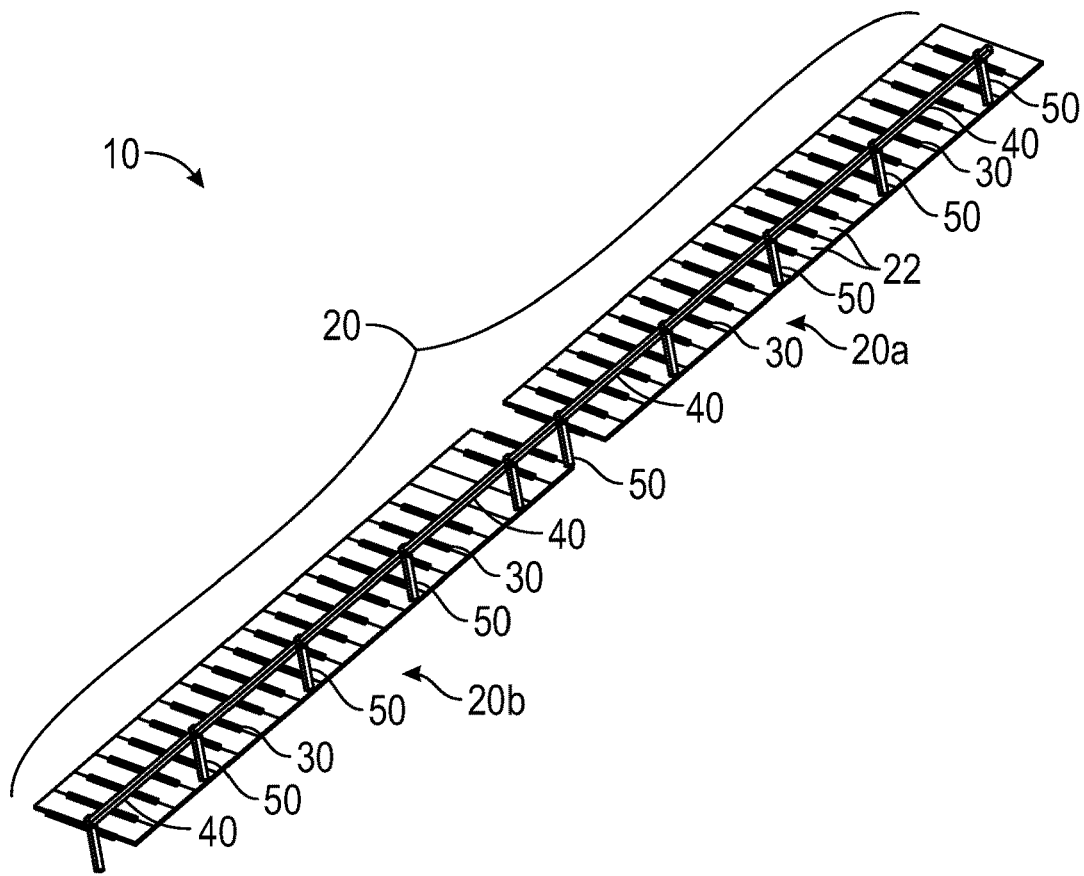
FIG. 2 is a second perspective view of the solar tracking system in accordance with the present disclosure.

One of the issues with wind loading of solar trackers is back driving. That is as the solar tracker is wind loaded, the wind can actually overcome the friction forces of the system and the driver (when not running) and allow the solar tracker to be forced beyond a desired position. As one of skill in the art will recognize, past a certain angle to the direction of the wind, the solar modules again act as a sail and being applying force against the driver, which causes this back driving. Without preventing back driving, the solar tracker could uncontrollably back drive and damage the solar modules or other components. To prevent back driving, many systems employ drive devices that have very high angle threads, they employ wind dampers, or other mechanisms which largely resist back driving. However, these systems come at a decided cost.

The present disclosure is directed to solar tracking systems and methods for articulating a solar tracking system. More specifically, the present disclosure is directed to a helically driven solar tracker. To enable helical drive of a solar tracker, a linear drive including one or more drive screws may be placed on one end of the solar tracker or in the middle of solar tracker. The linear drive moves the solar tracker linearly in a north-south direction. As the solar tracker is driven in a north-south direction, the torque tube rotates as it follows a helical guide mechanism. Further, as presented herein, the helical guide mechanism may be employed to minimize the amount of force that is translated back to a drive device, when the tracker is placed in a stow position.

Embodiments of the present disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

With reference to FIGS. 1-11, a solar tracking system capable of tracking the location of the sun provided in accordance with the present disclosure and is illustrated and generally identified by reference numeral 10. The solar tracking system 10 includes a solar array 20, a plurality of support beams 30 configured to support the solar array 20, a plurality of torque tubes 40 configured to support the plurality of support beams 30, a plurality of bases 50 configured to rotatably support the plurality of torque tubes 40, and drive mechanism 100 (FIG. 4) that is configured to rotate the plurality of torque tubes 40, and therefore the solar array 20, relative to the plurality of bases 50.

As illustrated in FIG. 1, the solar array 20 may be broken up into a first portion 20a and a second portion 20b, where the first and second portions 20a, 20b are spaced apart from one another along the length thereof defining a gap 20c therebetween. Each portion of the first and second portions 20a, 20b is substantially similar, thus, only the first portion 20a will be described in detail hereinbelow in the interest of brevity. The first portion 20a of the solar array 20 includes a plurality of photovoltaic modules 22, each of which is mechanically and electrically coupled to one another, although it is contemplated that each photovoltaic module 22 may be mechanically and/or electrically insulated from one another. The photovoltaic modules 22 may be any suitable photovoltaic module capable of generating electrical energy from sunlight, such as monocrystalline silicon, polycrystalline silicon, thin-film, etc. The photovoltaic modules 22 define an upper surface 22a and an opposite, bottom surface 22b. As can be appreciated, the upper surface 22a of the photovoltaic modules 22 includes the photovoltaic cells (not shown) while the bottom surface 22b includes any suitable means for fixedly or selectively coupling the photovoltaic modules 22 to the plurality of support beams 30, such as mechanical fasteners (e.g., bolts, nuts, etc.), adhesives, welding, etc. In embodiments, the photovoltaic cells may be disposed within a suitable frame 22c (FIG. 3) which includes suitable means for fastening the photovoltaic modules 22 to the plurality of support beams 30. In this manner, the frame 22c may include fastening means on a bottom surface thereof, or clamps or other suitable fasteners (e.g., Z-brackets, C-clamps, angle brackets, etc.) may be utilized to abut a portion of the frame 22c and selectively or fixedly couple the frame 22c to the plurality of support beams Each tube of the plurality of torque tubes 40 is substantially similar and, thus, only one torque tube 40 will be described in detail hereinbelow in the interest of brevity. The torque tube 40 defines a generally tubular configuration having a generally square profile, although it is contemplated that the torque tube 40 may have any suitable profile, such as rectangular, circular, oval, etc.

Figure 3:
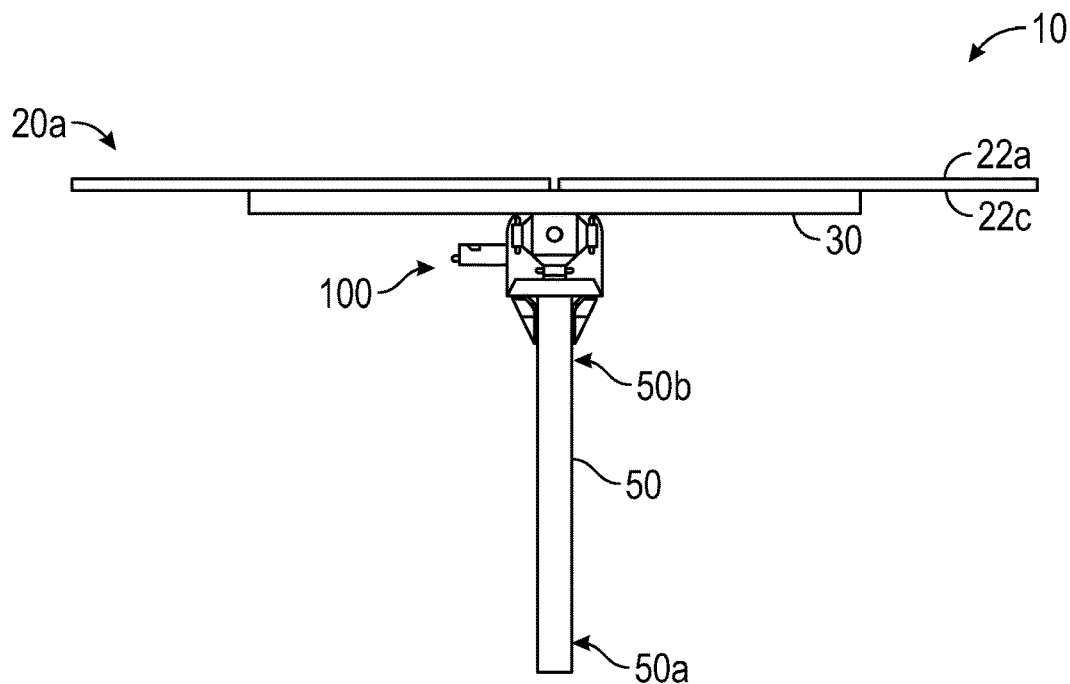
FIG. 3 is an end view of the solar tracking system in accordance with the present disclosure in a first position.
Figure 4:
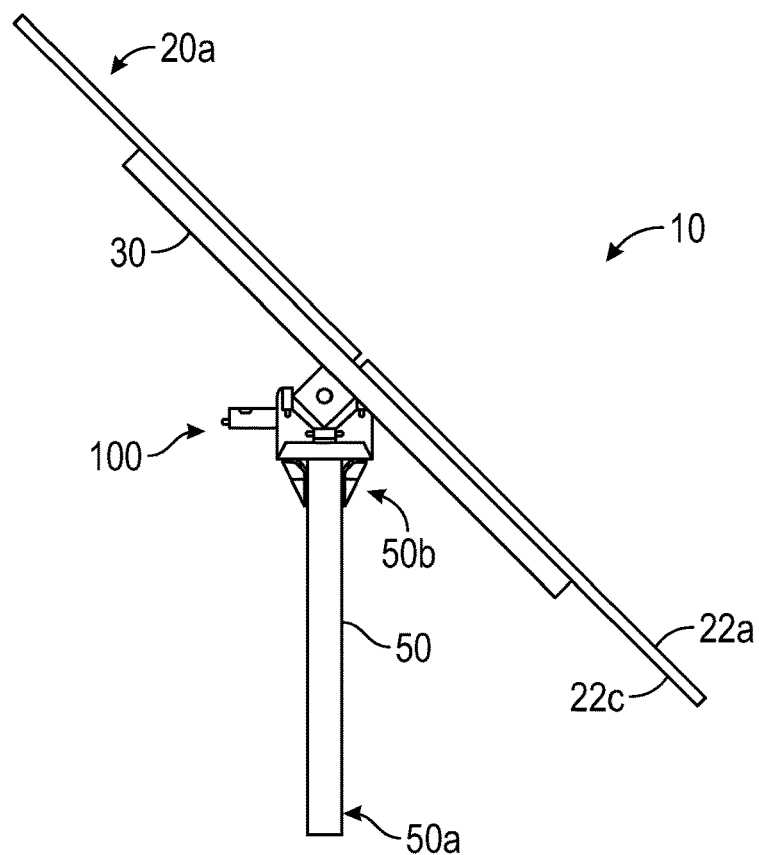
FIG. 4 is an end view of the solar tracking system in accordance with the present disclosure is a second position.

Turning to FIG. 3, each base of the plurality of bases 50 is substantially similar and, thus, only one base 50 will be described in detail hereinbelow in the interest of brevity. The base 50 is shown generally as being an I-beam, although it is contemplated that any suitable type of beam may be used, such as a U-channel, Box tubes, round tubes, etc. Each base 50 includes a first end portion 50a that is configured to be anchored in the ground or to a stationary object and a second, opposite end portion 50b that is configured to couple to a portion of the torque tube 40. It is contemplated that the base 50 may be formed from any material suitable for use outdoors and ground contact, such as steel (e.g., galvanized, stainless, etc.), aluminum, composites, polymers, etc. The comparison of FIG. 3 to FIG. 4 shows the chance in position of the solar tracker 10 as the solar array 20 is rotated relative to the bases 50. Thought only showing movement in one direction, one of skill in the art will recognize that the solar array 20 may also be driven in the opposite direction, and that the position of the solar array 20 is predominately determined based on the angle of the sun to the solar array 20 to maximize collection of solar energy.

Figure 5:
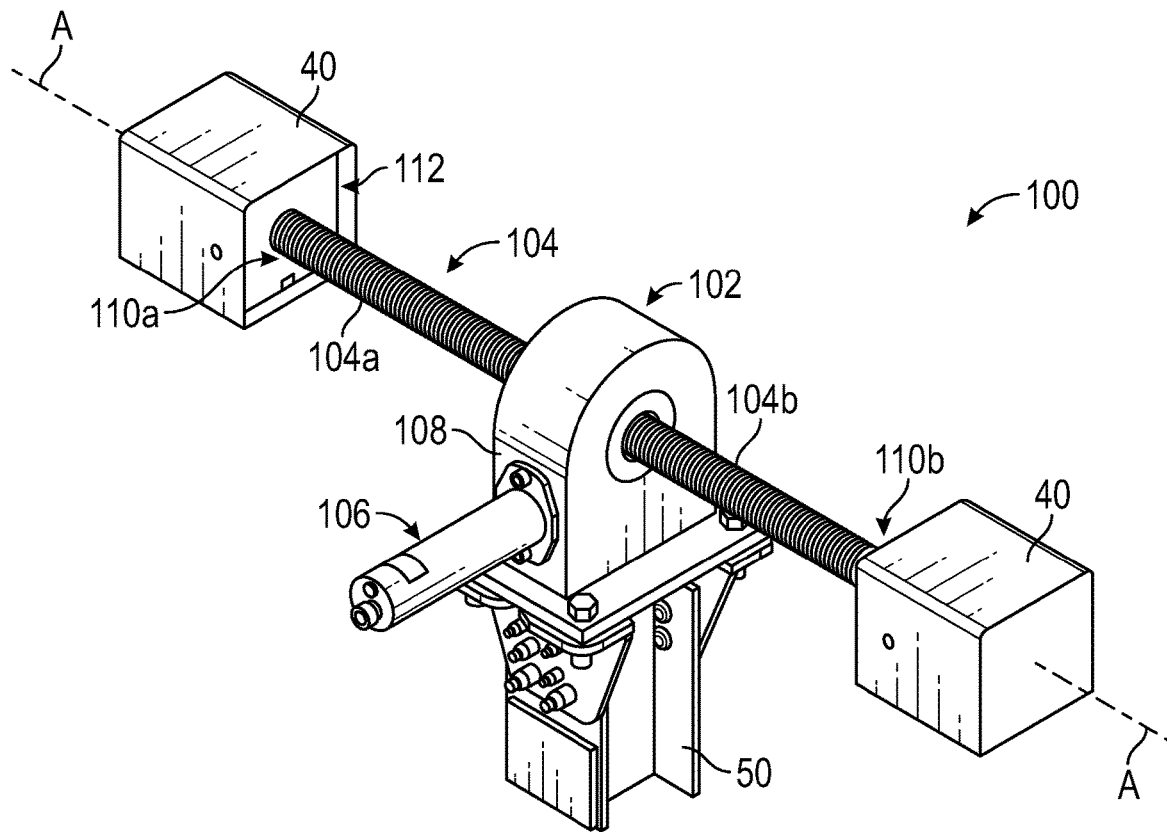
FIG. 5 is a perspective view of a drive mechanism of the solar tracking system in accordance with the present disclosure.

FIG. 5 depicts a drive mechanism 100. The drive mechanism 100 is supported by a base 50 and includes a gearbox 102, a power screw 104, and a motor 106. The gearbox 102 includes a housing 108 having a through-bore defined through opposing side surfaces thereof. The through-bore configured to rotatably retain a portion of the power screw 104 therein. The housing 108 also receives the motor 106. The gearbox 102 is to the base 50 using any suitable means, such as brackets, welding, adhesives, etc.

The power screw 104 extends between a first end portion 110a and a second, opposite end portion 110b and has a threaded outer surface 104a adjacent the first end portion 110a and a second threaded outer surface 104b adjacent the second end portion 110b. The first and second threaded outer surfaces 104a, 104b may be separated by an unthreaded or incomplete threaded center portion interposed therebetween. Each of the first and second threaded outer surfaces 104a, 104b defines a different thread direction (e.g., opposite one another), such that the first threaded outer surface 104a may define a right-hand thread whereas the second threaded outer surface 104b may define a left-hand thread, or vice versa. As can be appreciated, each of the first and second threaded outer surfaces 104a, 104b define a thread direction that is complementary to the drive direction of thread direction of respective threaded bores of the end caps 112, which are inserted into the torque tubes 40, such that the power screw 104 drives may engage the threaded bores. In this manner, as the power screw 104 is rotated in a first direction, the first and second threaded end caps 112 are drawn towards one another to reduce the gap between the two torque tubes 40 and as the power screw 104 is rotated in a second, opposite direction, the two torque tubes 40 are pushed away from one another to increase the gap. As will be described in further detail hereinbelow, the axial translation of the two torque tubes 40 results in helical rotation of the torque tubes 40 and the solar modules 22 attached thereto.

Figure 6:
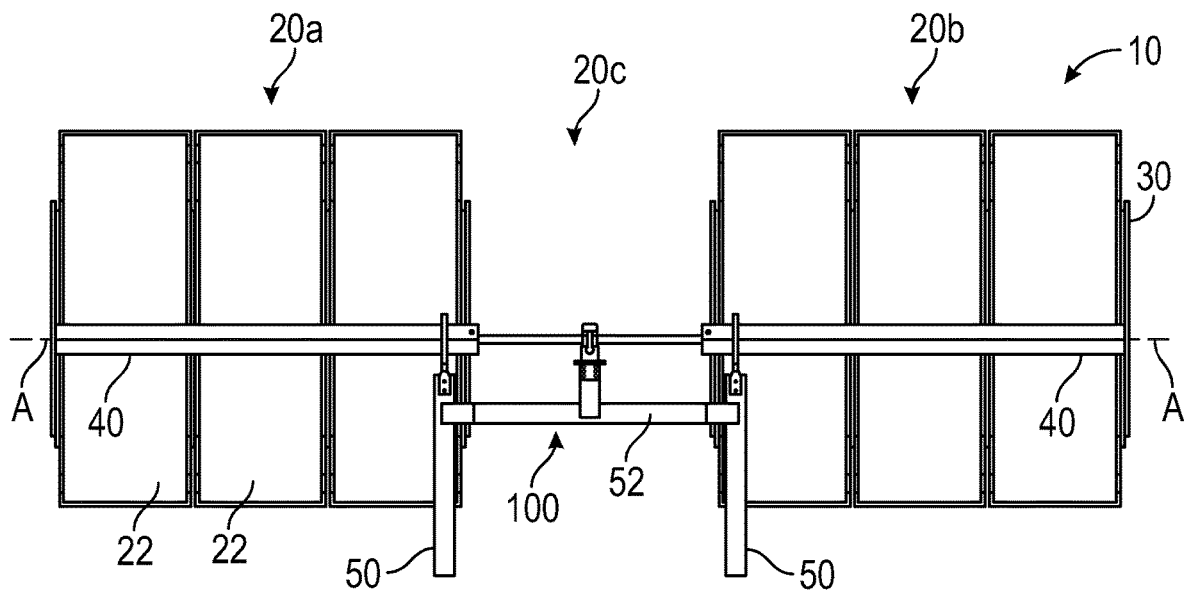
FIG. 6 is a side view of a solar tracking system in accordance with the present disclosure.

FIG. 6 depicts the drive mechanism 100 supported on a cross-beam 52 spanning two bases 50. This arrangement provides more support for the drive mechanism and the solar tracker 10 proximate the drive mechanism. In FIG. 6, the solar array 20 has been rotated away from the viewer to a position similar to that depicted in FIG. 4. As noted above, rather then being placed in the gap 20c between solar array portions 20a and 20b, the drive mechanism may be placed on just one end of the solar array 20. In such an arrangement the system my employ only one power screw 104.

Figure 7:
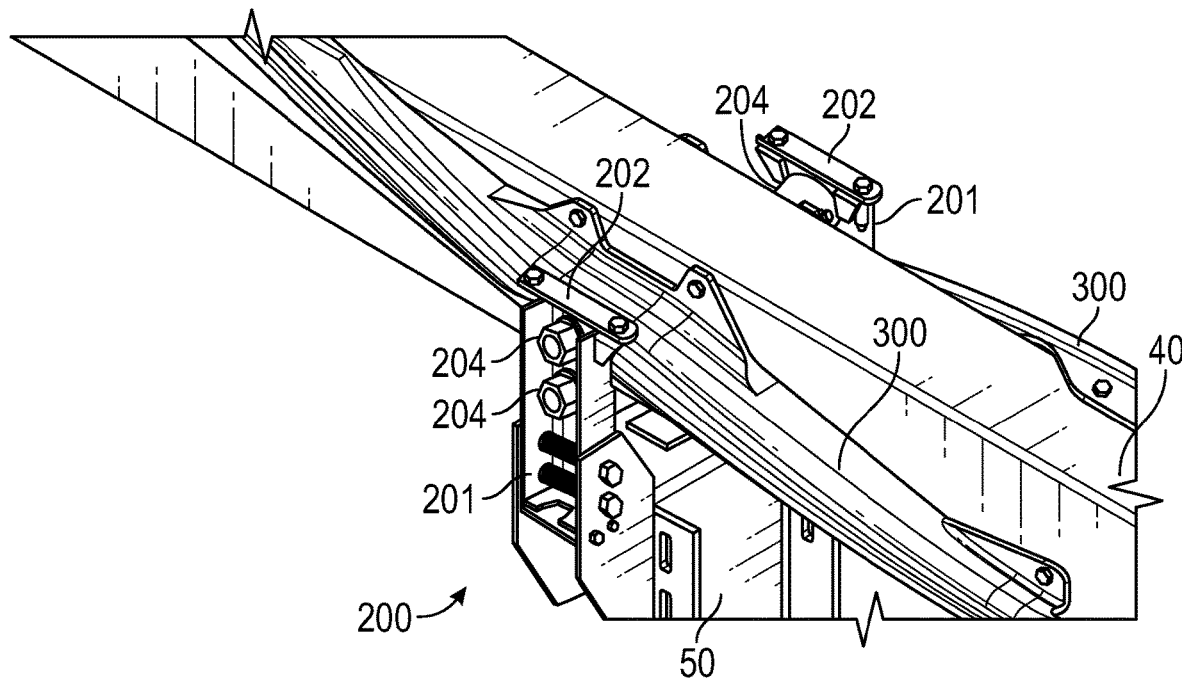
FIG. 7 is a perspective view of a helical drive mechanism in accordance with the present disclosure.

FIG. 7 depicts the cam assemblies 200 at each base 50, other than the base 50 where the drive mechanism 100 is located. As depicted in FIG. 7, the cam assemblies 200 includes a pair of supports 201. Each support 201 includes a top cap 202 and a pair of cams 204. The cams 204 are secured to the support 201 and include a bearing (not shown) therein to allow for free rotation of the cams 204. The top cap 200 secure the cams 204 on the support 201 and may include one or more springs, not shown to allow for the cams 204 to float in the support. Removal of the top cap 202 and the upper most of the cams 04 may be necessary for assembly of the solar tracker 10 and in particular connection of the torque tube 40 to the base 50 and cam assembly 200, as described in greater detail below.

On the torque tube 40 at each of the bases 50 is a helical guide device 300, depicted in FIG. 7 as formed of two separate components. The helical guide device 300 may be formed of steel (e.g., galvanized steel) or another material consistent with the make-up of the torque tube 40 to prevent galvanic action. The helical guide device 300 is may be bolted to the torque tube 40, or adhered with via rivets, adhesives or via welding or other means known to those of skill in the art.

Figure 8:
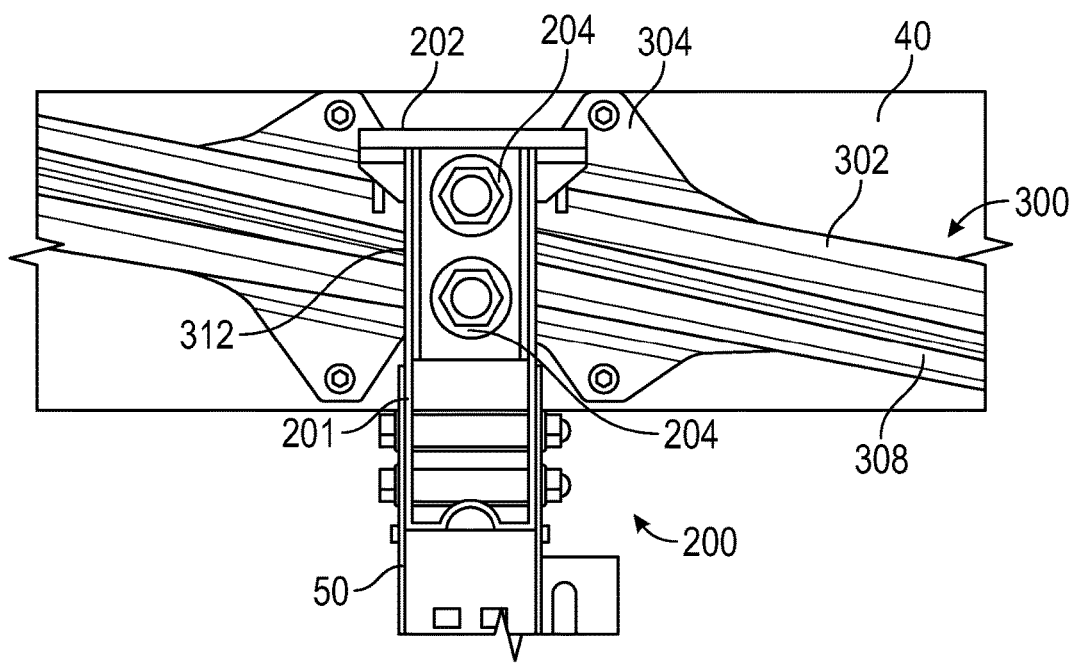
FIG. 8 is a side view of the helical drive mechanism in accordance with the present disclosure.
Figure 9:
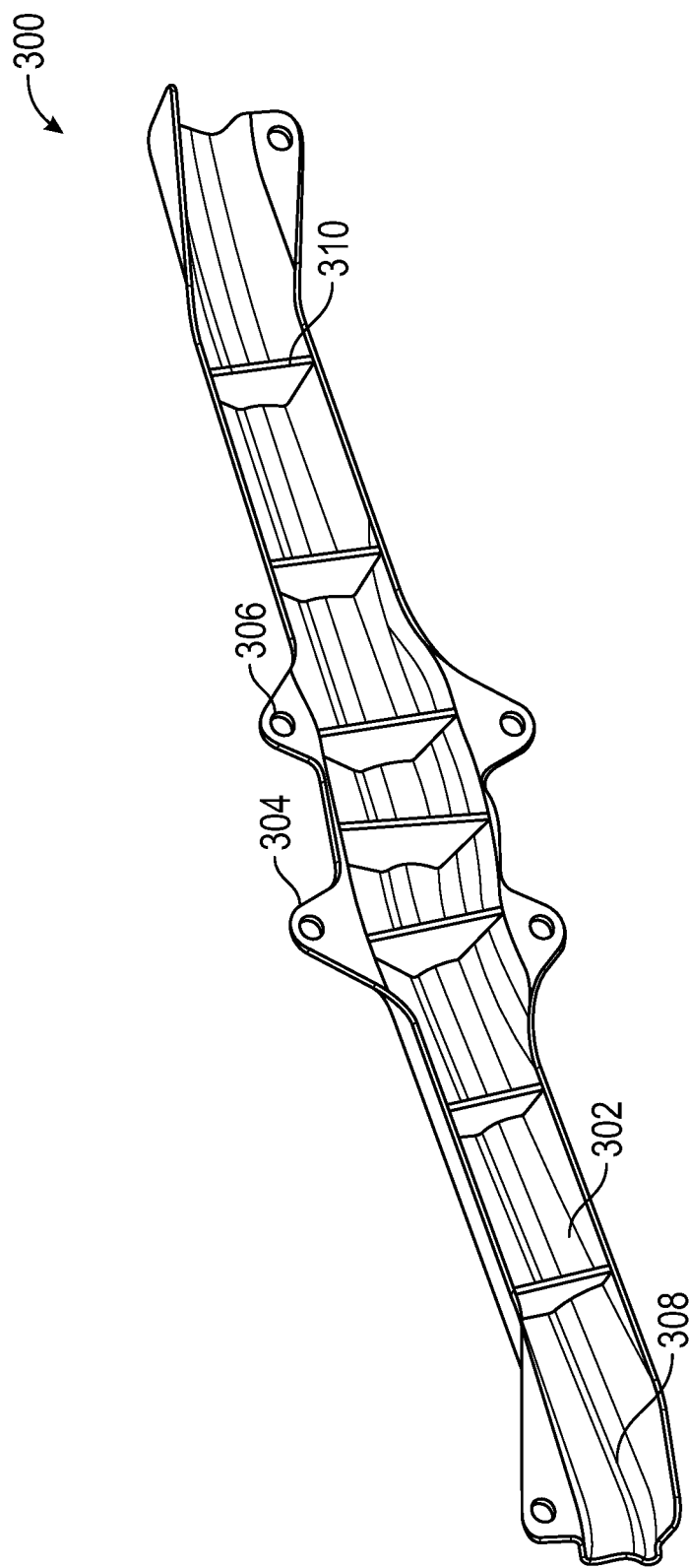
FIG. 9 is a back-side view of a helical guide device in accordance with present disclosure.

FIG. 8 provides a plan view of one side of the helical guide device 300 attached to the torque tube 40 and secured in the cam assemblies 200. The helical guide device 300 includes a body 302, a plurality of flanges 304 which may have holes 306 formed therein for receiving bolts and rivets or the like, and a cam follower 308. The flanges 304 and holes 306 may be arranged such that some of the holes 306 mate with a sidewall of the torque tube 40 and others made with a top wall of the torque tube, as shown in FIG. 7. The cam follower 308 is sized to fit between the two cams 204 located on each support 201, as described above.

Figure 11:
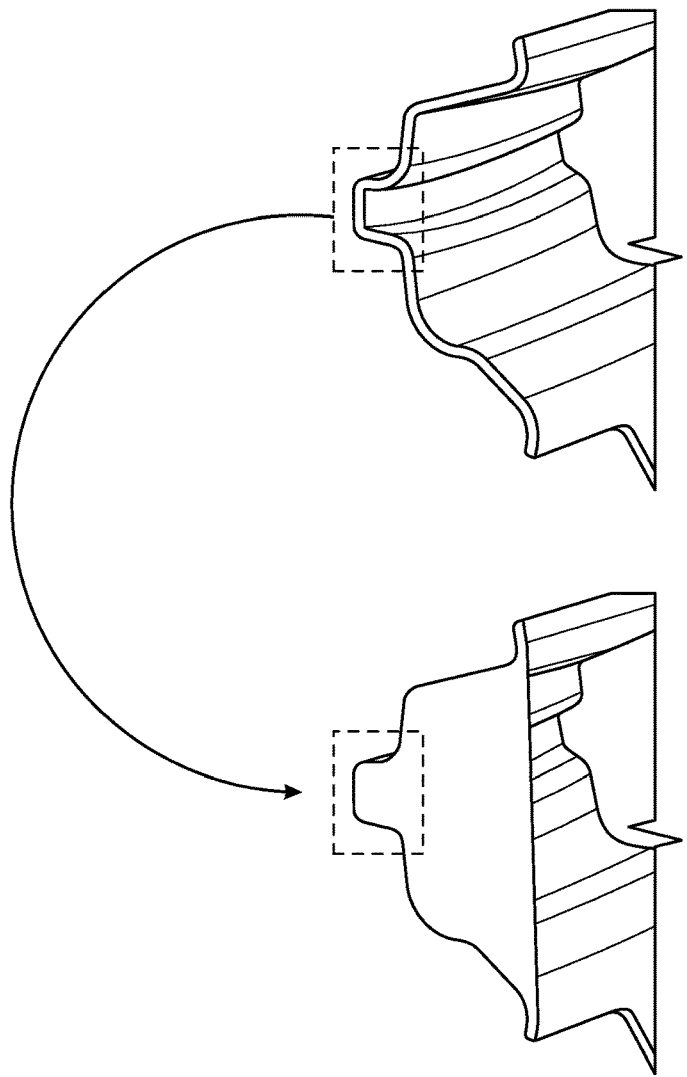
FIG. 11 is a close-up view of a portion of the helical guide device in accordance with the present disclosure.

The helical guide device 300 may be stamped, forged, press forged, cast, rolled, extruded, or pressed to achieve its final shape as depicted. On an internal side of the helical guide device 300 (i.e., a side that will face the torque tube 40 when applied thereto) are a plurality of webs 310 which provide support and increasing the rigidity of the body 302 along its length. In addition, as depicted in FIG. 11, the cam follower 308 may be first stamped to create the shape of the cam follower and then welded on a backside of the cam follower 308 to increase the strength and rigidity of the cam follower which, as will be described in greater detail below absorbs most if not all of the back driving forces applied to the solar array 20.

The machining process also achieves the formation of the cam follower 308 on the external side of the helical guide device 300. The cam follower 308 is formed in the body 302 of the helical drive device 300 such that it defines a helical path along its length. When the torque tube 40 is driven by the drive device 102, the cam follower 308 rides between the two cams 204. As the power screw 104 pushes or pulls on the torque tube 40, the cam follower 308 forces the torque tube 40 to rotate by acting on the cams 204. Thus, the power screw 104 forces the torque tube 40 to move along its longitudinal axis, and the cam assemblies 200, forces the torque tube 40 to rotate as the cam follower 308 of the helical guide device 300 slides over the cams 204.

Figure 10:
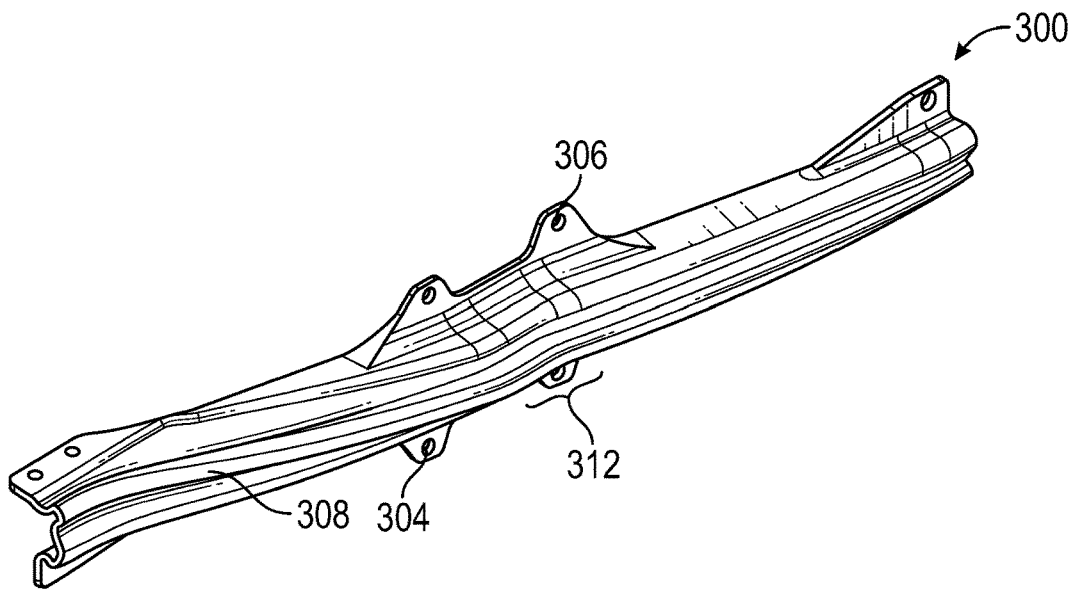
FIG. 10 is a front-side view of a helical guide device in accordance with present disclosure.

The helical path of the cam follower 308 may include a stow position portion 312. As depicted in FIG. 10, the stow position portion 312 is a flat portion of the cam follower 308. As shown, when the torque tube 40 of the solar array 22 is driven to the position where the stop position portion 312 is between the cams 204, the solar array will be in a 0-degree position, commonly used to stow solar arrays and solar trackers. That is, the solar array 20 will be substantially parallel to the ground (e.g., as depicted in FIG. 3). In this position, the interaction of the cams 204 and cam follower 308 allows for forces such as wind loading to be transmitted from the solar array 20 to the cam follower 308, to the cams 204, and ultimately to the bases 50. Little if any of the wind loading is then transmitted along the torque tube 40 to be absorbed by the drive device 100. That is the stow position portion 312 works as an anti-backdrive device. When used in conjunction with the inherent anti-backdrive properties of the power screw 104 the combination substantially prevents the power screw 104 from rotating when an external force is applied to the solar tracking system 10, such as wind, snow, wildlife, etc.

In the instant figures the stow position portion 312 is depicted as being a 0-degree stow position. However, it is contemplated that the stow position portion 312 may be and another angle. For example, in some instances the stop position for a given solar array 20 may be at 30-degrees, 45-degrees, 60-degrees, or any integer value therebetween without departing from the scope of the present disclosure. In these positions, some of the force allowed to the solar array 20 will still be absorbed via the cam follower 308 and cams 204 to reduce the backdrive of the solar array 20 and the drive device 102.

Although generally illustrated as being supported at a geometric center of rotation, it is contemplated that the solar array 20 may be rotatably supported at a center of mass. In this manner, the mass of the solar array 20 is balanced about the plurality of bases 50 and the torque required to rotate the solar array about the plurality of bases remains substantially consistent, with little to no variation in the torque required to articulate the solar array 20 through its range or motion. As such, the amount of energy required to articulate the solar array 20 is reduced and the various components required to support the solar array 20 may be substantially similar (e.g., no need to design certain components to take a larger load than others), thereby reducing design time and reducing the number of differing components in the solar tracking system 10.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A solar tracking system, comprising:
a torque tube supporting a solar module, the torque tube defining a single axis of rotation for the solar module;
a plurality of helical guides operably connected to an exterior surface of the torque tube; and
a plurality of cam assemblies, wherein upon linear movement of the torque tube, interaction between the plurality of helical guides and the plurality of cam assemblies causes the torque tube to rotate about its linear axis.

2. The solar tracking system according to claim 1, wherein the torque tube supports a plurality of solar modules.

3. The solar tracking system according to claim 1, wherein each of the plurality of helical guides includes a body, a cam follower, and a plurality of flanges.

4. The solar tracking system according to claim 3, wherein each of the plurality of helical guides is mechanically fastened to the exterior surface of the torque tube.

5. The solar tracking system according to claim 1, wherein each of the plurality of helical guides include a cam follower which mates with and follows one or more cams in the plurality of cam assemblies.

6. The solar tracking system according to claim 5, wherein the cam follower includes a stow position portion defining an angle of the solar module relative to the ground.

7. The solar tracking system according to claim 6, wherein the stow position portion corresponds to a 0-degree stow position wherein the solar module supported by the torque tube is substantially parallel to the ground.

8. The solar tracking system according to claim 7, wherein the one or more cams in the plurality of cam assemblies is a pair of cams, and the cam follower acts on the pair of cams to cause the rotation.

9. The solar tracking system according to claim 8, wherein when driven to the 0-degree stow position, substantially all torque applied to the torque tube is translated through the cam follower and to the pair of cams.

10. An assembly for a solar tracker, comprising:
a helical guide affixed to an exterior surface of a torque tube of a solar tracker; and
a cam assembly configured for rotatably receiving the torque tube and the helical guide therebetween, wherein upon linear movement of the torque tube, interaction between the helical guide and the cam assembly causes the torque tube and the helical guide to rotate relative to the cam assembly and about a linear axis of the torque tube.

11. The assembly according to claim 10, wherein the helical guide includes a cam follower which mates with and follows one or more cams in the cam assembly.

12. The assembly according to claim 11, wherein the cam follower includes a stow position portion defining an angle of a solar module mounted on the torque tube relative to the ground.

13. The assembly according to claim 12, wherein the stow position portion corresponds to a 0-degree stow position wherein the solar module supported by the torque tube is substantially parallel to the ground.

14. The assembly according to claim 13, wherein the cam assembly includes a pair of cams, and the cam follower acts on the pair of cams to cause the rotation.

15. A solar tracking system, comprising:
a torque tube supporting a solar module, the torque tube defining a single axis of rotation for the solar module;
a plurality of helical guides selectively coupled to an exterior surface of the torque tube; and
a plurality of cam assemblies, wherein upon linear movement of the torque tube, interaction between the plurality of helical guides and the plurality of cam assemblies causes the torque tube to rotate about its linear axis.

16. The solar tracking system according to claim 15, wherein each of the plurality of helical guides is selectively coupled to the exterior surface of the torque tube using mechanical fasteners.

17. The solar tracking system according to claim 15, further comprising a motor operably connected to the torque tube and arranged to translate the torque tube in a direction parallel to its longitudinal axis.

18. The solar tracking system according to claim 15, wherein each of the plurality of helical guides includes a cam follower which mates with an follows one or more cams in the plurality of cam assemblies.

19. The solar tracking system according to claim 18, wherein the cam follower includes a stow position portion defining an angle of the solar modules relative to the ground.

* * * * *